June 25, 1935.   H. NIELSEN   2,006,248
HEADLIGHT
Filed Oct. 2, 1933   2 Sheets-Sheet 1
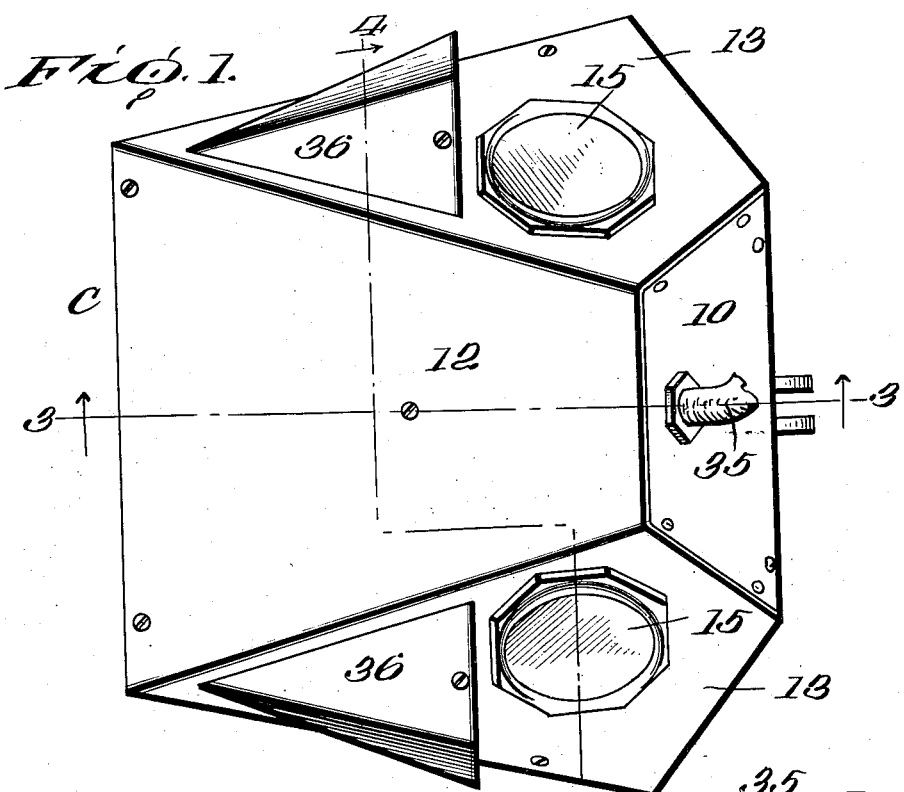
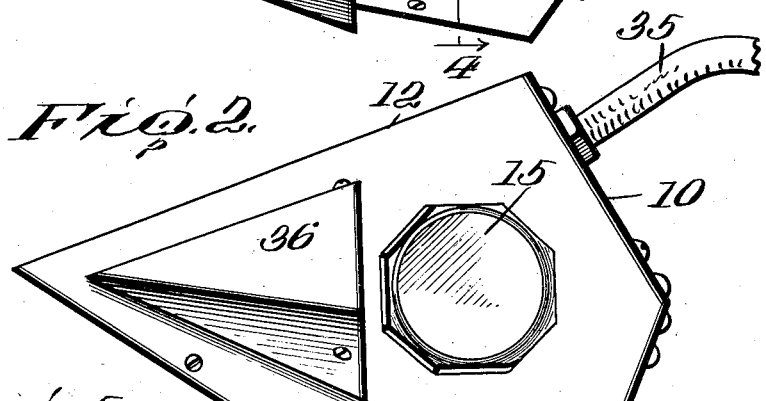
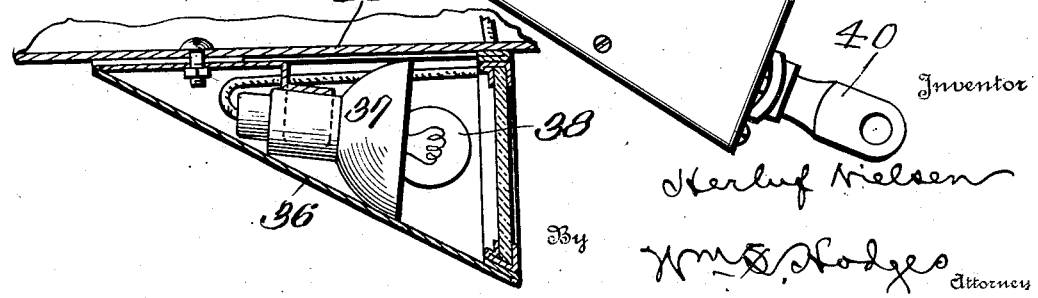

June 25, 1935.  H. NIELSEN  2,006,248
HEADLIGHT
Filed Oct. 2, 1933   2 Sheets-Sheet 2
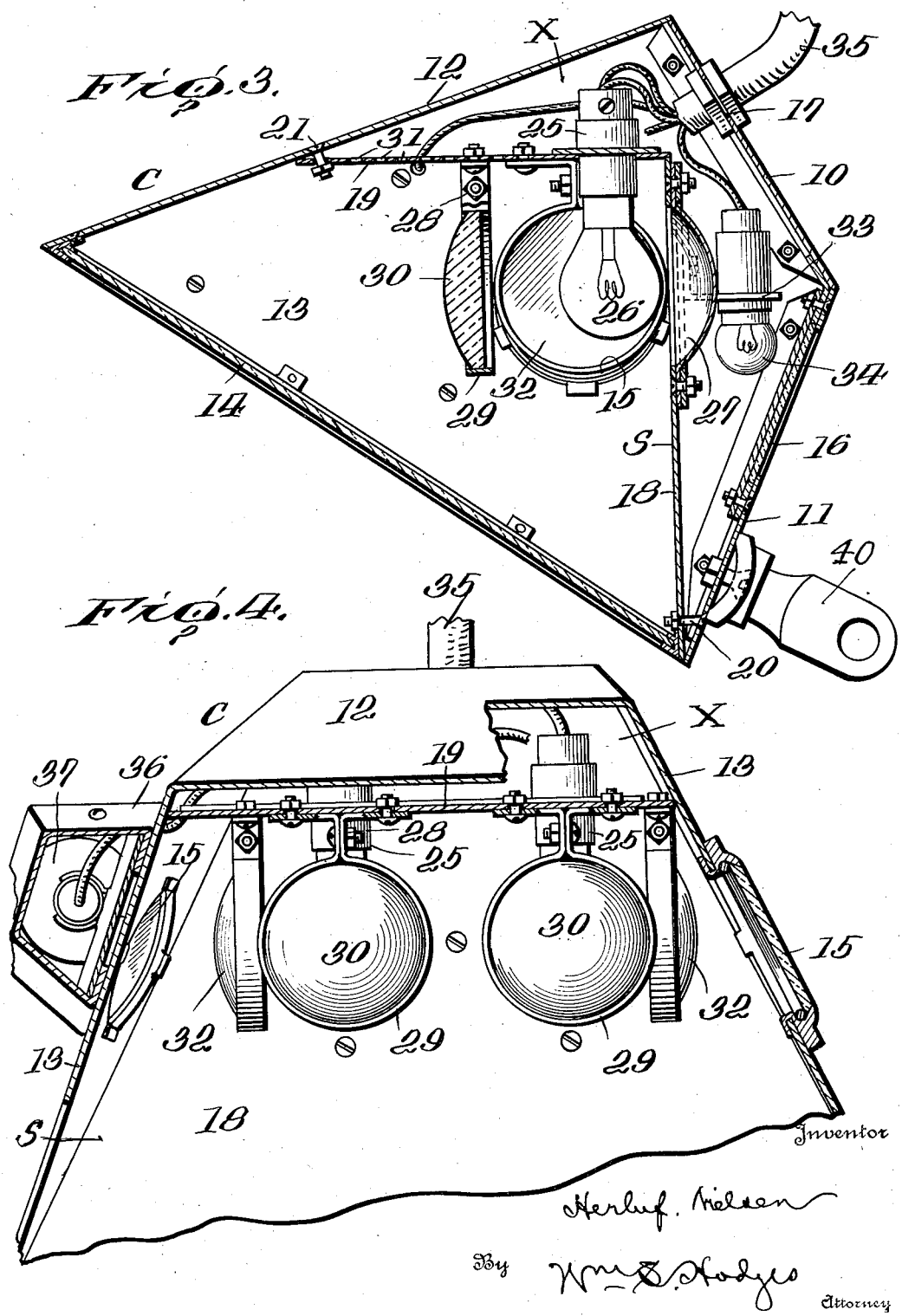

Patented June 25, 1935

2,006,248

UNITED STATES PATENT OFFICE 2,006,248

HEADLIGHT

Herluf Nielsen, New York, N. Y.

Application October 2, 1933, Serial No. 691,847

12 Claims. (Cl. 240—7.1)

This invention is a headlight for vehicles, and is more particularly designed for automobiles and other automatically propelled vehicles, although not limited thereto.

One of the objects of the invention is to provide a headlight of simple construction capable of projecting a forwardly directed beam of light over a roadway, in such manner as to provide adequate illumination, but at the same time prevent any portion of the beam from being directed into the eyes of drivers of approaching vehicles. A further object is to provide a headlight provided with means for projecting beams of light laterally in such manner as to adequately illuminate the sides of the roadway and the ditches along the roadway. A further object is to provide means for effectively illuminating the front end of the vehicle so as to clearly outline the contour thereof while driving over dark roads, thereby making the vehicle readily visible to drivers of approaching cars. A further object is to produce a headlight capable of so efficiently illuminating a roadway that a single headlight structure conforming to the invention may be substituted for and arranged to perform the functions of the two laterally spaced headlights which are now standard equipment on automobiles.

The invention will be hereinafter fully set forth and particularly pointed out in the claims.

In the accompanying drawings:—

Figure 1 is a top plan view. Figure 2 is a side elevation. Figure 3 is an enlarged longitudinal sectional view on the line 3—3, Figure 1. Figure 4 is an enlarged transverse sectional view on the line 4—4, Figure 1. Figure 5 is a detail sectional view illustrating one of the side lights.

Referring to the drawings, C designates a lamp casing constructed of a rear wall having two vertically and rearwardly converging sections 10 and 11, a top wall 12 which is forwardly and downwardly inclined from the upper edge portion of the rear wall, and two side walls 13. The top wall is wider at its forward edge than at its rear edge, and the rear wall is wider at its lower edge than at its top edge. Also, the side walls are wider at their front edges than at their rear edges, the assembly being such that a general flaring effect is given to the casing, the lower edges of the side walls, the top wall and the rear wall defining a forwardly and upwardly inclined opening with the top wall overhanging it, and which is normally closed by a suitable glass cover 14. The side walls 13 are each provided with an opening 15, and the portion 11 of the rear wall is also provided with an opening 16, said openings being preferably covered by glass or other transparent covers, as shown. The section 10 of the rear wall is also provided with an opening 17 for a purpose to be later described.

Located within the lamp casing C is a support member S consisting of two angularly disposed walls 18 and 19, respectively, extending between and contacting with both of the side walls 13. The wall 18 is so arranged within the casing as to stand in an approximately vertical position while the headlight is in use, and is secured at its lower edge in suitable manner to the adjacent portion of the rear wall, as by means of bolts 20. The overhanging wall of the supporting member S extends forwardly at approximately right angles from the supplemental wall 18, with its front edge in engagement with the top wall 12 at a position spaced rearwardly from the forward edge of said wall, said overhanging wall being secured to said top wall in suitable manner as by means of a bolt 21. By loosening and removing bolts 20 and 21, the support member and the parts carried thereby, as hereinafter described may be readily removed from or inserted into the casing as a single unit. As shown in Figure 3 of the drawings, the support member S is so disposed within the casing C that the vertical wall is in converging relation with respect to the portion 11 of the rear wall of the casing, and the horizontal wall is in converging relation with respect to the top wall 12 so as to provide a chamber X between the wall of the support member and the top and rear walls of the casing.

The overhanging wall 19 serves as means for supporting one or more lamps for illuminating purposes. Any desired number of lamps may be employed, but for purposes of illustration two standard type lamp sockets 25 are shown as depending from the wall 19, and so arranged that the lamps 26 carried thereby will be positioned opposite to reflector concavities 27, which are suitably polished to forwardly reflect the light eminating from said lamps.

Mounted in front of said lamp sockets are brackets 28, there being one for each lamp socket, said brackets serving to support ring-like frames 29, in which are mounted magnifying lenses 30. Each of said lenses is positioned forwardly with respect to a lamp, and in approximate axial alignment with a reflector 27. It will be noted that the member 19 is provided with a plurality of perforations 31 capable of receiving suitable bolts for securing the brackets 28 in position to said wall 19. By this arrangement, the bracket may be adjusted to positions toward or from the lamp as occasion may require. Fixedly secured to the overhanging plate 19 between each lamp 26 and the side opening 15 are additional magnifying lenses 32, and approximately in axial alignment with said openings these lenses being supported by brackets and rings similar to those which carry the lenses 30.

Extending rearwardly from the wall 18 is a bracket 33, in which is mounted a small lamp 34, positioned opposite to the opening 16. Current from a suitable source of electrical energy (not shown) is supplied to the lamps 26 and 34 by means of a cable 35 entering through the opening 17, said cable containing separate conductors leading to the respective lamps.

Mounted on the outer surface of each side wall 13 of the casing C is an auxiliary lamp casing 36, which is provided with a reflector 37 and a lamp 38 connected with the cable 35 by a suitable conductor. These auxiliary lamp casings are open at their rear ends, so that the beams projected from their lamps are directed rearwardly and slightly laterally upon the adjacent portions of the vehicle. It will be understood that these supplemental casings may be of any desired shape or contour, but are shown as approximating prismatic form, and the large rear ends thereof are normally closed by glass or other transparent covers. The casings are so arranged as to prevent the light projected from the lamps 38 from being directed forwardly into the eyes of approaching drivers.

In practice, the lamp casing is supported in any suitable or desired manner, preferably by means of a bracket 40, suitably attached to the portion 11 of the rear wall, said bracket being mounted upon a support of any preferred type which is carried on the standard cross bar at the front of the vehicle between the front fenders thereof. It is preferred to adjust the casing C so that the wall 18 will stand in an approximately vertical position, so that the forward edge of the top wall 12 will be slightly below the filament of the lamps 26. In this manner, the angular position of the top wall will prevent the projection of the light beam upwardly in such manner as to annoy drivers of approaching vehicles.

The advantages of the invention will be readily understood by those skilled in the art to which it belongs. For instance, an important advantage is that the lamp may be supported in a position midway between the fenders of a motor vehicle, so that the beam from the lamps 26 will be projected forwardly and downwardly in a manner to effectively illuminate the roadway ahead of the machine. At the same time, as above stated, the beam will be directed in such manner that it cannot reach the eyes of drivers of approaching vehicles. It will also be observed that the roadway between the front wheels is illuminated by a portion of the beam of light passing downwardly through the opening 14, and simultaneously light is directed side-wise through the openings 15 in the side walls, so as to illuminate the space laterally with respect to the course of travel of the vehicle, thereby defining the sides of the roadway and the ditches which frequently parallel the road. It will also be observed that the auxiliary lamps 38 are so supported that they brilliantly illuminate the radiator as well as the fenders of the car, but yet they are so positioned that none of the light projected by these lamps may be directed into the eyes of the driver, because said lamps are supported well below the top of the radiator, and at such positions that the projected beams are interrupted by the radiator and fenders. This illumination of the radiator is also increased by means of the lamp 34. By employing the magnifying lenses, the beams are materially sharpened so that their illuminating power is greatly enhanced. It will therefore be seen that an important advantage of the invention is the capability of providing full and effective illumination of the roadway without objectionable glare in the eyes of approaching drivers, combined with restful illumination for the driver of the vehicle equipped with the lamp embodying the invention.

Having thus explained the nature of the invention and described an operative manner of constructing and using the same, although without attempting to set forth all of the forms in which it may be made, or all of the forms of its use, what is claimed is:—

1. In a lamp of the character described, a casing provided with a forwardly and downwardly inclined top wall and with laterally and downwardly inclined side walls, a support member located within said casing and having an overhanging portion, lamp supporting means carried by said overhanging portion, and auxiliary lamp casings on said side walls each provided with lamp supporting means, said auxiliary casings being so constructed and arranged as to project rearwardly and slightly laterally directed beams of light from the lamps therein.

2. In a lamp of the character described, a lamp casing provided with a forwardly and downwardly inclined top wall and with laterally and downwardly inclined side walls, an angular support member located within said casing and so constructed and arranged with respect to the casing as to provide a chamber between the support member and adjacent portions of the casing, lamp supporting means carried by said support member, auxiliary lamp casings on said side walls each provided with lamp supporting means, said casings being open at their rear ends and so constructed and arranged as to project rearwardly and slightly laterally directed beams of light, and a plurality of conductors constructed and arranged to be connected with a source of electricity, said conductors being located in said chamber and connected with the respective lamps.

3. In a lamp of the character described, a casing consisting of an angular rear wall formed with two rearwardly converging portions, a top wall extending forwardly and downwardly from said rear wall, and laterally and downwardly extended side walls joining the top and rear walls, said side walls having openings therein and said rear wall also having an opening therein, a support member located within said casing and provided with angularly disposed portions, lamp supporting means carried by one of the angularly disposed portions of the support member, magnifying members also carried by the same portion of the support member, and located forwardly with respect to the lamp supporting means, other magnifying members carried by the same portion of the support member and located between the respective lamps and the adjacent openings in said side walls, reflector members carried by the other portion of the support member, a lamp socket also carried by the last mentioned support portion and positioned adjacent the opening in the rear wall, auxiliary lamp casings on said side walls each provided with lamp supporting means, said auxiliary casings being so constructed and arranged as to project rearwardly and slightly laterally directed beams of light, and means for connecting the respective lamp supporting means with a source of electrical energy.

4. In a headlight lamp, a casing provided with top, side and rear walls so arranged that the lower edges of the rear and side walls and the forward end of the top wall define a forwardly and upwardly inclined opening with the top wall overhanging it, a support member interposed between and engaging the side walls of the casing, said support member consisting of a vertical partition having an upper horizontal portion extended forwardly therefrom, means securing the lower extremity of said support member to said rear wall, means securing the forward extremity of the horizontal portion to the top wall, and means engageable with the horizontal portion for supporting a lamp in such manner as to depend into the casing.

5. In a headlight lamp, a casing provided with top, side and rear walls so arranged that the lower edges of the rear and side walls and the forward edge of the top wall define a forwardly and upwardly inclined opening with the top wall overhanging it, a support member fixedly mounted within the casing and interposed between and engaging the side walls thereof, said support member consisting of a vertical wall having a horizontal wall projecting forwardly from the upper edge thereof, and lamp supporting means carried by the horizontal wall, the walls of said support member being spaced from the rear and top walls respectively of the casing, in such manner as to provide a concealing chamber for electrical connections to the lamp.

6. In a headlight, a casing provided with an angular rear wall formed of two vertically and rearwardly converging portions, side walls and a top wall, the lower edges of the side and rear walls and the forward edge of the top wall being so arranged as to define a forwardly and upwardly inclined opening with the top wall overhanging it, a support member removably mounted within the casing and interposed between and engaging the side walls thereof, said support member consisting of a vertical wall having a horizontal wall projecting forwardly from its upper edge, said vertical wall being in converging relation with respect to the lower portion of the rear wall, and said horizontal wall of the support member being in converging relation with respect to the top wall of the casing so as to provide a concealing chamber for electrical connections to the lamp, and lamp supporting means secured to the horizontal portion of the support member in such manner that a lamp supported thereby will depend into the casing.

7. In a headlight lamp, a casing provided with top, side and rear walls so arranged that the lower edges of the rear and side walls and the forward end of the top wall define a forwardly and upwardly inclined opening with the top wall overhanging it, a support member removably mounted within the casing and interposed between and engaging the side walls of the casing, said support member consisting of a vertical partition having a horizontal portion extended forwardly from the upper part thereof, a reflector supported by said vertical partition, a lens depending from the horizontal portion of said support member in a position opposite said reflector, and means carried by said horizontal extension for supporting a lamp in a depending position between the reflector and the lens.

8. In a headlight, a casing provided with a forwardly and upwardly inclined opening therein with the top wall of the casing overhanging the same, a support member removably mounted within said casing and interposed between and engaging the side walls thereof, said support member consisting of a vertical partition and a horizontal portion extending forwardly from the upper part thereof, one or more reflectors supported by the vertical partition, means carried by the horizontal portion of the support member for supporting one or more lamps in focus with the respective reflectors, there being one lamp for each reflector, said support member and the lamps and the reflectors carried thereby being insertable into and removable from the lamp casing as a single unit.

9. In a headlight, a casing provided with a forwardly and upwardly inclined opening therein with the top wall of the casing overhanging the opening, a support member removably mounted within the casing and provided with intersecting vertical and horizontal walls interposed between and engaging the side walls of the casing, the vertical wall of said support member having one or more openings therein, reflectors covering said openings, there being one reflector for each opening, a corresponding number of lenses suspended from the horizontal wall of the support member in position axially aligned with the respective reflectors, and lamp sockets also carried by said horizontal portion in position to support the lamps in such manner as to depend between the reflectors and the lenses aligned therewith, said support member and the lamps, reflectors and lenses carried thereby being insertable into and removable from the casing as a single unit.

10. In a headlight, a casing provided with a forwardly and upwardly inclined opening therein with the top wall of the casing overhanging the opening, the side walls of said casing each having an opening therein, a support member mounted within said casing, said support member consisting of intersecting vertical and horizontal portions so supported that the horizontal portion also overhangs said inclined opening, said vertical portion having one or more reflectors, lenses suspended from the horizontal portion of the support member and located within the casing in positions in axial alignment with the respective reflectors, other lenses also depending from said horizontal portion within the lamp casing at right angles to the first mentioned lenses and in approximate axial alignment with the side openings, and lamp sockets depending from said horizontal member in positions to support lamps between the respective reflectors and their aligned lenses and adjacent to the side lenses, said support member and the reflectors, lenses and lamp sockets carried thereby being insertable into the lamp casing and removable therefrom as a single unit.

11. In a headlight, a casing provided with an angular rear wall formed of two vertically and rearwardly inclined intersecting portions, said casing having a forwardly and upwardly inclined opening with the top wall of the casing overhanging the same, a support member mounted within said casing and consisting of a vertical portion and a horizontal portion, said support member and the adjacent portions of the walls of said casing being so constructed and arranged as to provide a chamber, said rear wall having an opening therein, one or more reflectors carried by said vertical portion, one or more lamps carried by said horizontal portion in axial alignment with said reflectors, and lamp-supporting means projecting from the rear portion of the vertical portion into said chamber in such manner as to support a lamp opposite to the opening in the rear wall, and so that the light emanating therefrom will not be projected through the inclined opening of the lamp casing, said support member and the lamps and reflectors carried thereby being insertable into and removable from the lamp casing as a unitary structure.

12. In a headlight, a casing provided with a forwardly and upwardly inclined opening therein with the top wall of the casing overhanging the same, a support member mounted within the casing and consisting of a vertical portion and a horizontal portion, the horizontal portion also overhanging said opening, means for securing the edges of the vertical and horizontal portions to the rear and top walls respectively of the lamp casing, means for securing one or more lamps to the horizontal portion in a manner to depend into said casing, auxiliary lamp casings secured to the outer surfaces of the said casing, and lamp-supporting means in the respective auxiliary casings, said last mentioned casings being so constructed and arranged as to project rearwardly and slightly laterally directed beams of light from the lamps therein.

HERLUF NIELSEN.